United States Patent

[11] 3,559,684

| [72] | Inventor | Charles J. Rudewick, III<br>Newark, Del. |
|---|---|---|
| [21] | Appl. No. | 770,302 |
| [22] | Filed | Oct. 24, 1968 |
| [45] | Patented | Feb. 2, 1971 |
| [73] | Assignee | Speakman Company<br>Wilmington, Del.<br>a corporation of Delaware |

[54] ROTATABLE AND RECIPROCAL MIXING VALVE AND ADJUSTMENT LIMIT STOP
11 Claims, 5 Drawing Figs.

[52] U.S. Cl. ............................................. 137/625.17,
251/285
[51] Int. Cl. ............................................. F16k 11/00
[50] Field of Search ............................................. 137/625.17,
636.4; 251/285, 288

[56] References Cited
UNITED STATES PATENTS
1,943,865  1/1934  Hennessey.................... 251/285X

| 3,170,488 | 2/1965 | Manoogian.................. | 137/625.17 |
| 3,397,863 | 8/1968 | Bell.............................. | 251/285 |
| 3,415,280 | 12/1968 | Bucknell et al............... | 137/625.17 |

*Primary Examiner*—William R. Cline
*Attorney*—Connolly and Hutz

ABSTRACT: Valve arrangement comprises valve casing with mixing valve therein and valve stem extending outwardly therefrom. Tubular collar fixed to casing surrounds valve stem, and rotatable and reciprocal valve operator is connected to stem for rotating and reciprocating mixing valve relative to casing. Improvement comprises spaced apart fixed stop and readily accessible adjustable stop on tubular collar. Projection on valve operator is positioned between stops and constructed and arranged to engage stops to limit rotation of valve operator. Pin is connected to tubular collar and abutment on valve operator engages pin when operator is moved inwardly toward mixing valve to prevent inward movement of operator at all rotary positions thereof except when projection on operator is near fixed stop on tubular collar.

PATENTED FEB 2 1971　　　　　　　　　　　3,559,684

ROTATABLE AND RECIPROCAL MIXING VALVE AND ADJUSTMENT LIMIT STOP

BACKGROUND OF THE INVENTION

The present invention relates to a valve arrangement, and more particularly to a valve operator for such an arrangement that limits the temperature of discharge flow to a predetermined value, and only permits initial valve actuation at low temperature discharge rates.

Single operator valve arrangements are well known in the plumbing art and usually include a mixing valve with an operator connected thereto for reciprocating and rotating the valve. Reciprocation of the mixing valve controls the discharge rate while rotation of the valve controls the mixture of two fluid components, such as hot and cold water, for example. For the most part, many existing single operator valve arrangements do not include structure for limiting the temperature of the discharge fluid to a safe level well below the temperature of the hot water facility. Also, the present single operator valve arrangements fail to limit the initial temperature of the discharge fluid to a low safe figure. Thus, when the prior valve arrangements are initially actuated scalding of the person actuating the valve is quite possible, especially when the mixing valve is in total communication with the hot water inlet thereby causing only hot water to flow.

Several arrangements have proposed that purportedly solve the above problem by limiting the maximum temperature of the discharge water to a maximum safe temperature well below that of the hot water facility. However, these arrangements are tedious to adjust and in most cases the valve operator must be completely removed to install separate temperature limiting stop structure. Also, with these arrangements it is easy to overshoot or undershoot the desired limit of maximum discharge temperature due to angular movement of the stop structure prior to fastening that structure in place. Finally, with the available temperature limiting structure it is impossible to provide full hot water if such is desired unless, of course, the valve arrangement is dismantled and the stop structure removed therefrom.

Accordingly, an object of the present invention is to provide a unique valve arrangement which limits the temperature of discharge flow to a safe value, and only permits initial valve actuation at low temperature discharge rates.

SUMMARY OF THE INVENTION

In accordance with the present invention a valve arrangement is provided comprising a valve casing with a mixing valve inside the casing and a valve stem extending outwardly therefrom. A tubular collar fixed to the casing surrounds the valve stem, and a rotatable and reciprocal valve operator is connected to the stem for rotating and reciprocating the mixing valve relative to the valve casing. The improvement of this invention comprises a fixed stop and a readily accessible adjustable stop both connected to the tubular collar. A projection on the valve operator is positioned between the fixed and adjustable stops with the projection arranged to engage the stops to limit rotation of the valve operator. Moreover, a pin is connected to the tubular collar and an abutment on the valve operator engages the pin when the operator is moved inwardly toward the mixing valve to prevent further inward movement of the operator at all rotary positions thereof except when the projection on the operator is near the fixed stop on the tubular body.

The valve operator of the present invention reciprocates between inward and outward positions relative to the mixing valve. The adjustable stop is located on the collar so that the operator conceals that stop when inwardly positioned and exposes it when outwardly positioned. The readily accessible adjustable stop may comprise a slot in the tubular collar together with a stop block mounted in the slot and fastening structure for securing the stop block to the tubular collar at any position along the slot. Moreover, the stop block may include a bifurcated portion that straddles the tubular collar with the fastening structure urging the bifurcated portion into clamping engagement with the collar to secure the stop block thereto at any position along the slot.

Preferably, the valve casing has hot and cold inlets and at least one outlet with the mixing valve disposed between the inlets and outlet. Rotation of the valve operator to the position where the projection on the operator is near the fixed stop on the collar causes substantially total communication of the mixing valve with the cold inlet under flow conditions. The position of the adjustable stop on the collar determines the maximum amount of communication between the mixing valve and the hot inlet under flow conditions.

Additionally, the present invention may simply include the spaced apart fixed and readily accessible adjustable stops on the tubular collar with a projection on the valve operator positioned between the stops. The projection is arranged to engage the stops to limit rotation of the valve operator.

Further, the present invention may simply involve a valve arrangement wherein the tubular collar has a pin connected thereto with an abutment on the valve operator that engages the pin when the operator is moved inwardly toward the mixing valve. This arrangement prevents further inward movement of the operator at all rotary positions thereof except when the operator positions the mixing valve in a predetermined relationship with the valve casing.

BRIEF DESCRIPTION OF THE DRAWING

Novel features and advantages of the present invention in addition to those mentioned above will become apparent to one skilled in the art from a reading of the following detailed description in conjunction with the accompanying drawing wherein similar reference characters refer to similar parts and in which.

DETAILED DESCRIPTION OF THE INVENTION

Figure 1:
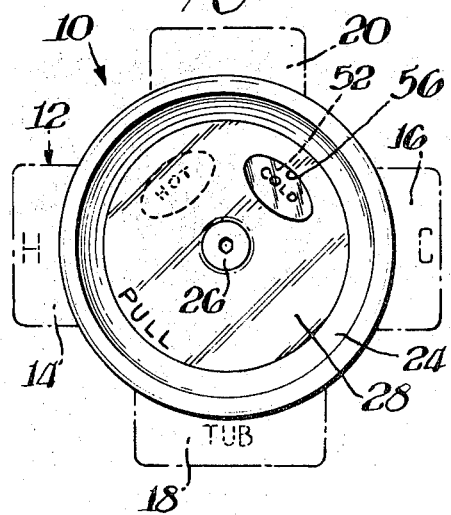
FIG. 1 is a front elevational view of a valve arrangement according to the present invention.
Figure 2:
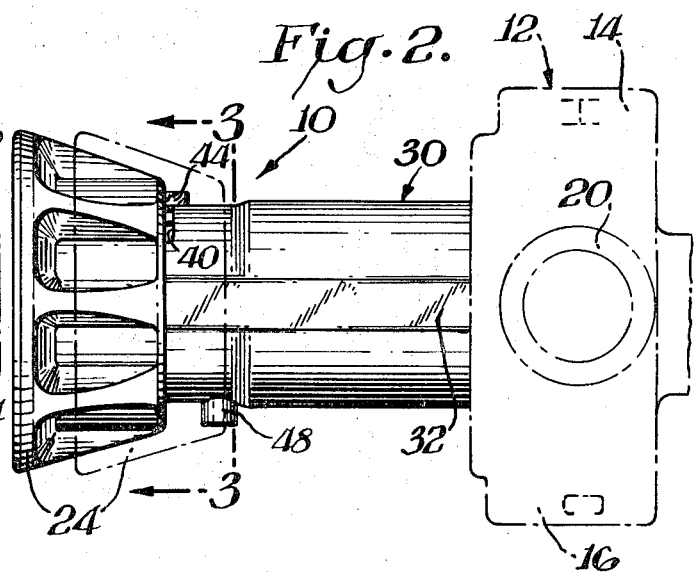
FIG. 2 is a top plan view of the valve arrangement illustrated in FIG. 1.

Referring in more particularity to the drawing, FIGS. 1 and 2 illustrate a valve arrangement 10 comprising a valve casing 12 having a hot water inlet 14 and a cold water inlet 16. The discharge lines from the casing include a tub discharge 18 and a second discharge 20 which in most instances is connected to a showerhead. A single operator mixing valve (not shown) is located within the casing 12 between the inlets and the outlets. Generally the mixing valve includes a valve element movable into and out of communication with the hot and cold water inlets. The valve rotates and reciprocates inside the casing 12 with rotation thereof determining the mixture of hot and cold water, and reciprocation of the valve determining the discharge rate of the selected mixture. A valve utilizing a similar principle is shown, for example, in U.S. Pat. No. 3,287,985, granted to Moer Nov. 29, 1966.

The valve element has a valve stem 22 connected to a valve operator 24 by a fastener 26. The valve operator includes a face plate 28 for indicating the relative temperature of the discharge water under flow conditions. Generally, movement of the valve operator 24 away from the valve casing 12 brings the valve element into greater communication with the fluid inlets 14, 16 to thereby increase the discharge rate. Rotation of the operator varies the ratio of communication between the fluid inlets and the mixing valve to thereby determine the temperature of the water discharge. The valve arrangement 10 further includes a tubular sleeve or collar 30 anchored to the valve casing 12 by a force fit connection or other securing means. The tubular collar 30 is fixed relative to the valve casing 12 so that rotation of the valve operator 24 causes the operator to rotate about the collar, as shown in FIG. 2.

The present invention also includes structure for limiting the temperature of the fluid discharge to a safe level. This structure comprises a fixed stop 32 on the tubular collar 30 and a readily accessible adjustable stop 34 spaced apart from the fixed stop but also positioned on the tubular collar. The readily accessible stop 34 is adjustable over a wide range of positions which ultimately determine the maximum temperature of fluid discharge from the valve arrangement under flow conditions. The valve operator 24 has a projection 36 on its interior surface 38 which is positioned between the fixed stop 32 and the adjustable stop 34. Thus, rotation of the valve operator is limited to that degree of rotation defined by the span or space between the stops on the tubular collar. When the projection 36 engages the fixed stop 32 the mixing valve is oriented in complete communication with the cold water inlet 16. Accordingly, when the valve operator 24 is pulled away from the valve casing 12 only cold water flows through the casing to the discharge lines. On the other hand, when the projection 36 on the valve operator 24 abuts or contacts the adjustable stop 34 on the collar 30 the mixing valve is usually positioned in communication with both the hot and cold water inlets. As explained more fully below, the valve communicates with both water inlets at all positions of the adjustable stop 34 on the collar 30 except when the adjustable stop is furthest removed from the fixed stop 32. Accordingly, as the adjustable stop 34 is moved closer to the fixed stop 32 the amount of available rotation of the valve operator decreases whereby the temperature of the discharge fluid also decreases.

Figure 4:
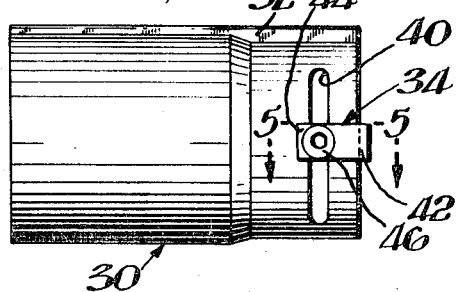
FIG. 4 is a left side elevational view of the tubular collar and adjustable stop means of the present invention.
Figure 5:
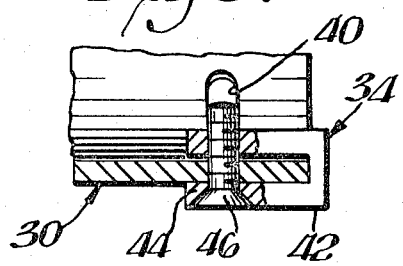
FIG. 5 is a sectional view taken along line 5–5 of FIG. 4.

The readily accessible adjustable stop 34 comprises a slot 40 in the tubular collar 30, as best shown in FIG. 4. The stop also includes a stop block 42 with a bifurcated portion 44 that straddles the tubular collar 30 at the end of the collar closest to the valve operator. A fastener 46 extends through each leg of the bifurcated portion 44 and also through the slot 40 in the collar 30. Tightening of the fastener 46 functions to urge the bifurcated portion 44 of the stop block into clamping engagement with the collar to secure the stop block thereto at any position along the slot 40. The adjustable stop 34 is readily accessible without dismantling the valve arrangement 10. In this regard, when the valve operator is pulled outwardly away from the valve casing 12 both the fastener 46 and the stop block 42 are exposed. The fastener is easily loosened with an appropriate tool such as a hex key wrench and the valve arrangement then set to limit the temperature of the discharge fluid to a safe level. This is accomplished by rotating the valve operator 24 in a counterclockwise direction to increase the temperature of the discharge fluid to the desired level. When the desired temperature is obtained the stop block 42 of the adjustable stop 34 is moved into engagement with the projection 36 on the inside surface 38 of the valve operator 24. After contact is made the fastener 46 is tightened to anchor the stop block to the tubular collar 30 at this position. Subsequent operation of the valve arrangement then causes the projection 36 to abut the adjustable stop at the same position whereby the safe maximum temperature of the fluid discharge is limited to the temperature determined by the location of the adjustable stop 34 on the tubular collar.

Figure 3:
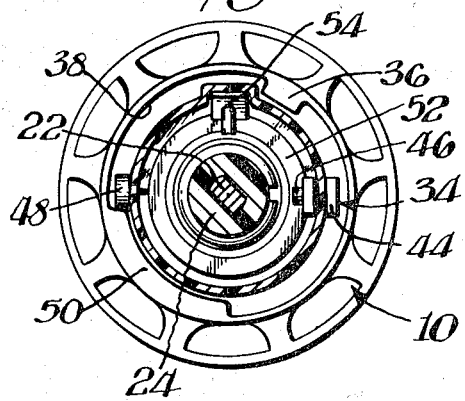
FIG. 3 is a sectional view taken along line 3–3 of FIG. 2.

The present valve arrangement also includes structure for preventing initial actuation of the valve at all rotary positions of the valve operator 24 except when the mixing valve is in complete or substantially complete communication with the cold water inlet 16. This structure includes a pin 48 on the tubular collar 30, as shown best in FIGS. 2 and 3. The pin cooperates with an abutment 50 on the inside surface 38 of the valve operator 24. When the valve operator is pulled away from the valve casing 12 to the outer extreme of its reciprocating motion, the maximum discharge rate is obtained. Assuming this flow rate to include a mixture of hot and cold water, when the valve operator is pushed inwardly to terminate flow through the valve casing the abutment 50 engages the pin 48 prior to completion of inward movement of the valve operator. Although the flow rate is at a minimum, termination of flow does not occur until the valve operator is moved closer to the valve casing or in other words to the inward extreme of its reciprocating motion. This is accomplished by rotating the valve operator 24 until the pin 48 on the tubular collar 30 clears the abutment 50, as shown in FIG. 3. Once this relationship occurs the operator is urged inwardly to terminate fluid flow. Under these conditions the projection 36 on the valve operator 24 is very close to the fixed stop on the tubular collar.

As mentioned above, when the projection is so positioned the temperature of the fluid discharge is close to that of the cold water temperature since the hot inlet is blocked by the mixing valve. Thus, termination of fluid flow may only occur when the mixing valve is positioned to discharge fluid at approximately the temperature of the water in the cold inlet 16. The same relationship exists when the valve operator is pulled outwardly to commence fluid flow through the valve arrangement. Hence, the valve arrangement is preset to deliver fluid close to the temperature of the cold water upon initial actuation of the valve operator 24.

The overall effect of the valve arrangement 10 provides a simple mechanism for controlling the maximum temperature of the discharge fluid, and is particularly useful when the hot water facility produces hot water at extremely high temperatures. Scalding of persons utilizing the valve arrangement is prevented in two ways. First, the maximum temperature of the fluid discharge is limited to a safe predetermined level by positioning the stop block 42 of the adjustable stop 34 so as to effect delivery of only warm or hot water but not scalding water. Second, the pin 48 on the tubular collar 30 and the abutment 50 on the inside surface 38 of the valve operator 24 function to provide cold or near cold water discharge upon initial actuation of the valve arrangement. Under no conditions can hot water be discharged from the valve casing upon initial actuation of the valve arrangement.

A temperature indicating plate 52 may be positioned behind the face plate 28 of the valve operator 24. The plate 52 has an arm 54 which rests inside the hollow formed by the fixed stop 32 and is thereby held in a stationary position relative to the movement of the valve operator. An opening 56 in the face plate 28 frames a portion of the indicating plate 52 for all positions of the valve operator 24 to thereby visually indicate the temperature of the discharge fluid.

I claim:

1. In a valve arrangement comprising a valve casing with a mixing valve inside the casing and a valve stem extending outwardly therefrom, a tubular collar fixed to the casing surrounding the valve stem, and a rotatable and reciprocal valve operator connected to the valve stem for rotating and reciprocating the mixing valve relative to the valve casing, the improvement according to which the tubular collar has spaced apart fixed stop means and readily accessible adjustable stop means, a projection on the valve operator positioned between the fixed and adjustable stop means constructed and arranged to engage the stops to thereby limit rotation of the valve operator, a pin connected to the tubular collar, and an abutment on the valve operator constructed and arranged to engage the pin on the tubular collar when the operator is moved inwardly toward the mixing valve to prevent complete inward movement of the operator at all rotary positions thereof except when the projection on the operator is near the fixed stop on the tubular collar.

2. The combination of claim 1 in which the valve operator reciprocates between inward and outward positions relative to the mixing valve, and wherein the readily accessible adjustable stop means is located on the tubular collar so that the operator conceals the adjustable stop means when inwardly positioned and exposes the adjustable stop means when outwardly positioned.

3. The combination of claim 2 in which the readily accessible adjustable stop means comprises a slot in the tubular collar, a stop block mounted in the slot, and fastening means for securing the stop block to the tubular collar at any position along the slot.

4. The combination of claim 3 in which the stop block includes a bifurcated portion that straddles the tubular collar, and wherein the fastening means urges the bifurcated portion of the stop block into clamping engagement with the collar to secure the stop block thereto at any position along the slot.

5. The combination of claim 1 in which the valve casing has hot and cold inlets and at least one outlet with the mixing valve disposed between the inlets and the outlet, and wherein rotation of the valve operator to the position where the projection on the operator is near the fixed stop means on the collar causes substantially complete communication of the mixing valve with the cold inlet under flow conditions.

6. The combination of claim 5 in which the position of the adjustable stop means on the collar determines the maximum amount of communication between the mixing valve and the hot inlet under flow conditions.

7. In a valve arrangement comprising a valve casing with a mixing valve inside the casing and a valve stem extending outwardly therefrom, a tubular collar fixed to the casing surrounding the valve stem, and a rotatable and reciprocal valve operator connected to the valve stem for rotating and reciprocating the mixing valve relative to the valve casing, the improvement according to which the tubular collar has spaced apart fixed stop means and readily accessible adjustable stop means located on the surface of the collar and spaced apart less than 180°, and a projection on the valve operator positioned between the fixed and adjustable stop means in the area of the shortest arcuate distance between the stop means constructed and arranged to engage the stops to thereby limit rotation of the valve operator.

8. The combination of claim 7 in which the valve operator reciprocates between inward and outward positions relative to the mixing valve, and wherein the readily accessible adjustable stop means is located on the tubular collar so that the operator conceals the adjustable stop means when inwardly positioned and exposes the adjustable stop means when outwardly positioned.

9. The combination of claim 8 in which the readily accessible adjustable stop means comprises a slot in the tubular collar, a stop block mounted in the slot, and fastening means for securing the stop block to the tubular collar at any position along the slot.

10. In a valve arrangement comprising a valve casing with a mixing valve inside the casing and a valve stem extending outwardly therefrom, a tubular collar fixed to the casing surrounding the valve stem, and a rotatable and reciprocal valve operator connected to the valve stem for rotating and reciprocating the mixing valve relative to the valve casing, the improvement according to which the tubular collar has a pin connected thereto, and an abutment on the valve operator constructed and arranged to engage the pin on the tubular collar when the operator is moved inwardly toward the mixing valve to prevent complete inward movement of the operator at all rotary positions thereof except when the operator positions the mixing valve in a predetermined relationship with the valve casing.

11. In a valve arrangement comprising a valve casing with a mixing valve inside the casing and a valve stem extending outwardly therefrom, a tubular collar fixed to the casing surrounding the valve stem, and a rotatable and reciprocal valve operator connected to the valve stem for rotating and reciprocating the mixing valve relative to the valve casing, the improvement according to which the tubular collar has spaced apart fixed stop means and readily accessible adjustable stop means, and a projection on the valve operator positioned between the fixed and adjustable stop means constructed and arranged to engage the stops to thereby limit rotation of the valve operator, the valve operator being arranged to reciprocate between inward and outward positions relative to the mixing valve, and the readily accessible adjustable stop means being located on the tubular collar so that the operator conceals the adjustable stop means when inwardly positioned and exposes the adjustable stop means when outwardly positioned, the readily accessible adjustable stop means comprising a slot in the tubular collar, a stop block mounted in the slot and fastening means for securing the stop block to the tubular collar at any position along the slot, the stop block including a bifurcated portion that straddles the tubular collar and the fastening means urging the bifurcated portion of the stop block into clamping engagement with the collar to secure the stop block thereto at any position along the slot.